I. HUPP.
TRANSMISSION MECHANISM.
APPLICATION FILED NOV. 19, 1917.

1,429,349. Patented Sept. 19, 1922.
7 SHEETS—SHEET 1.

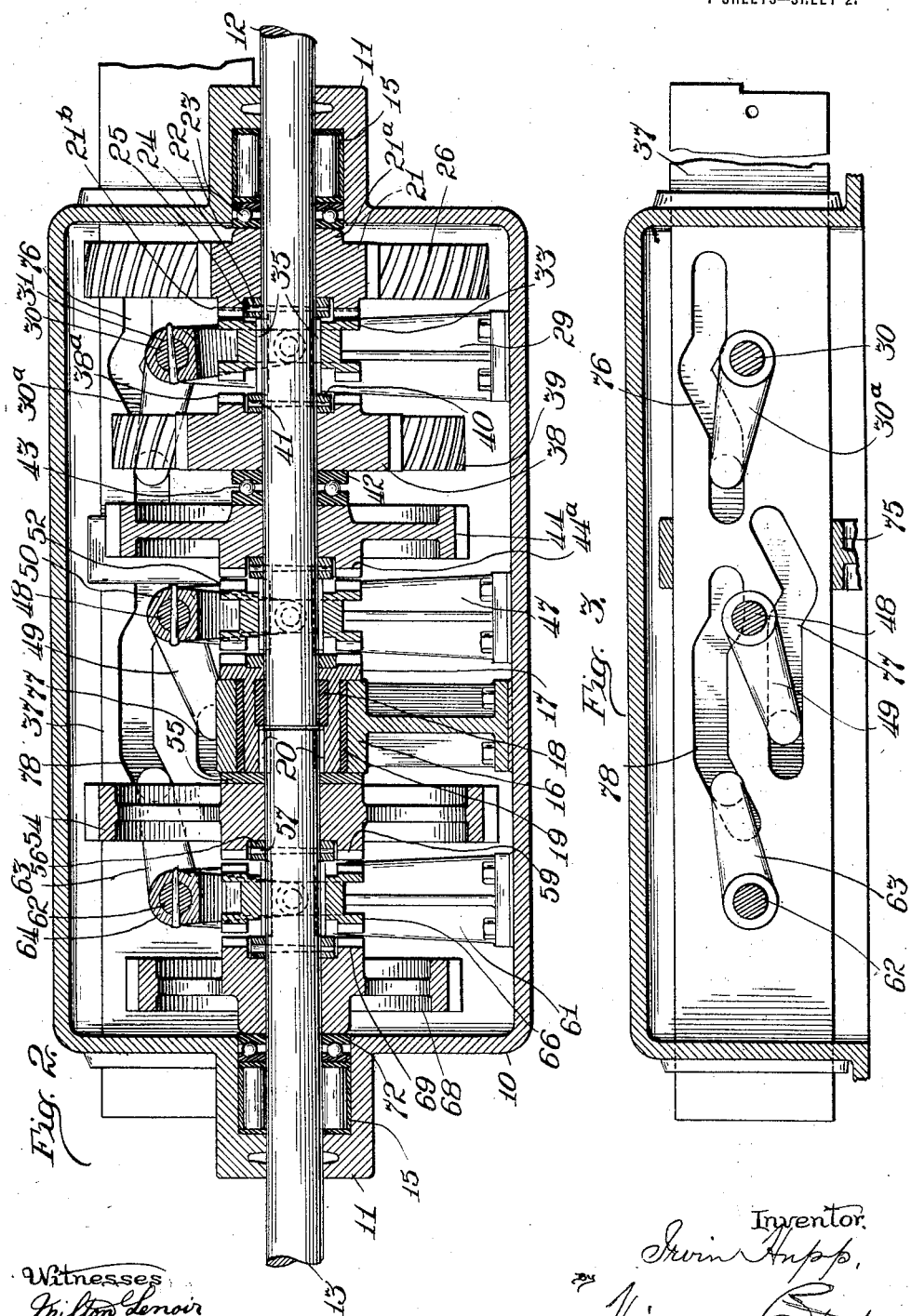

I. HUPP.
TRANSMISSION MECHANISM.
APPLICATION FILED NOV. 19, 1917.

1,429,349.

Patented Sept. 19, 1922.
7 SHEETS—SHEET 3.

Witnesses

Inventor
Irvin Hupp,
By
Attorneys

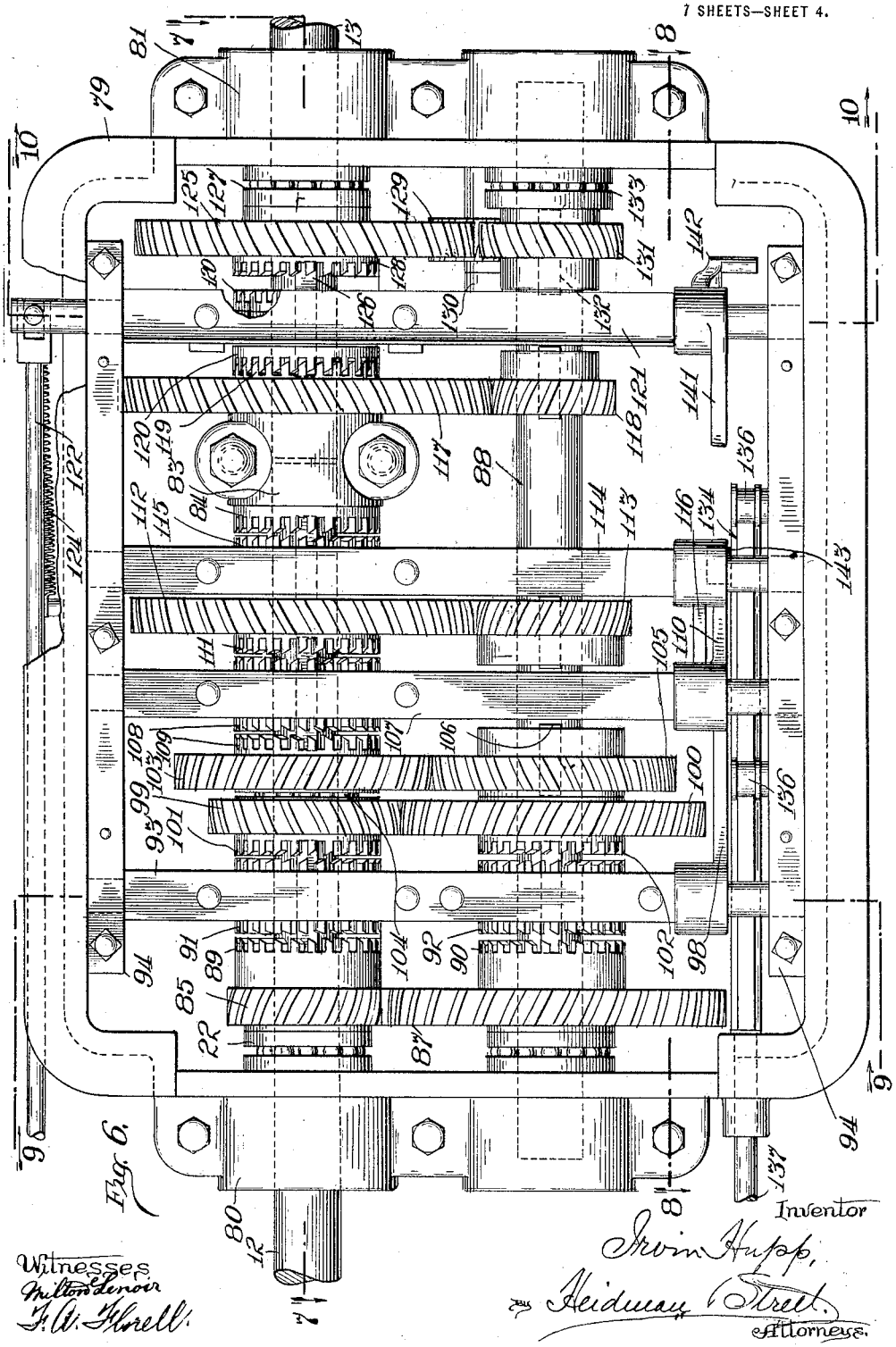

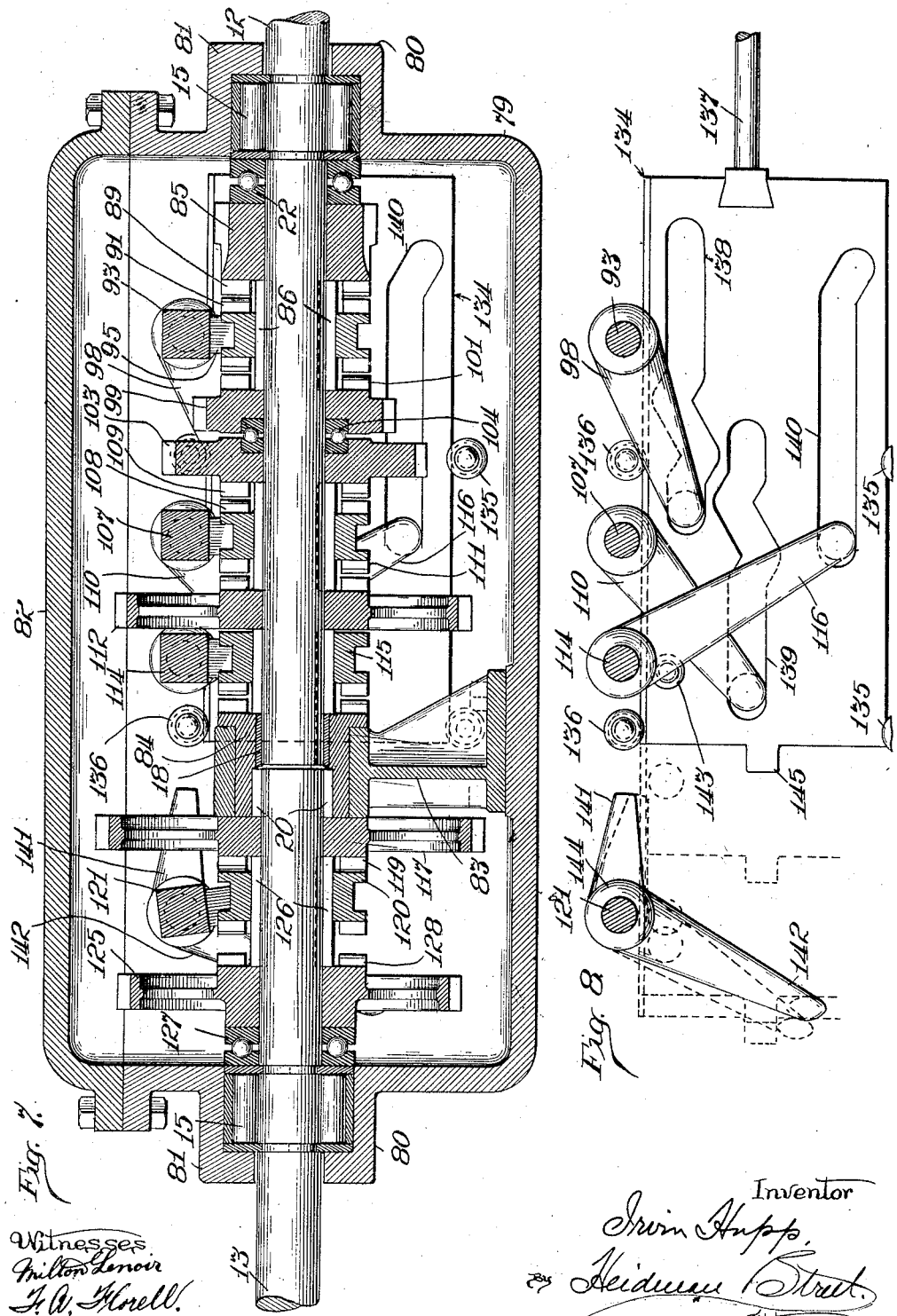

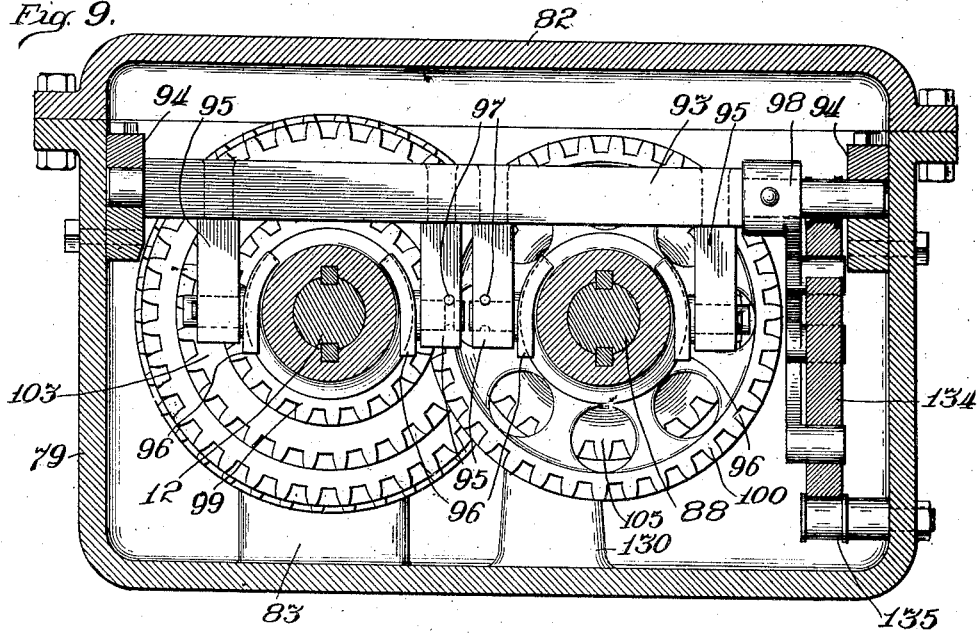
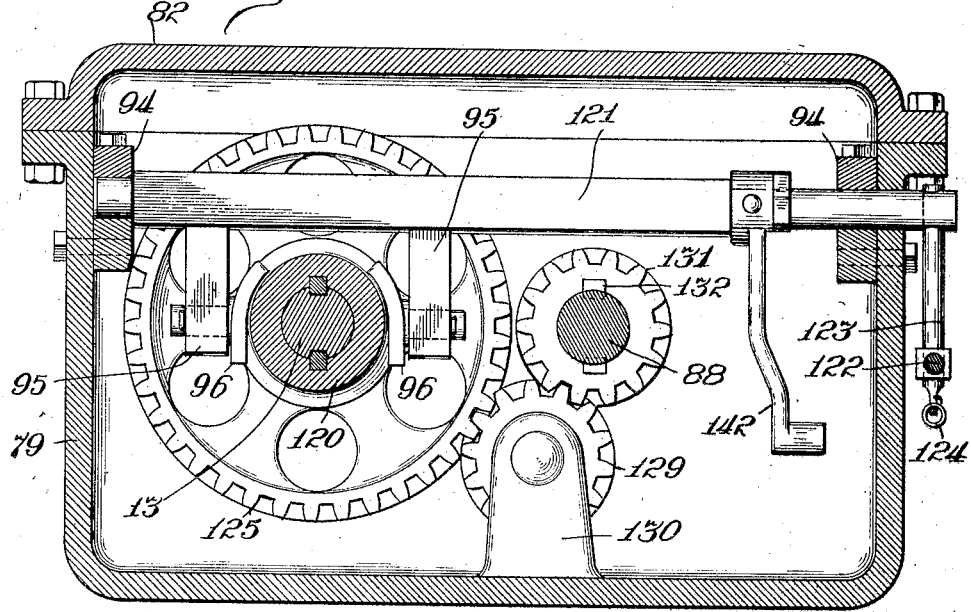

I. HUPP.
TRANSMISSION MECHANISM.
APPLICATION FILED NOV. 19, 1917.
1,429,349.
Patented Sept. 19, 1922.
7 SHEETS—SHEET 7.
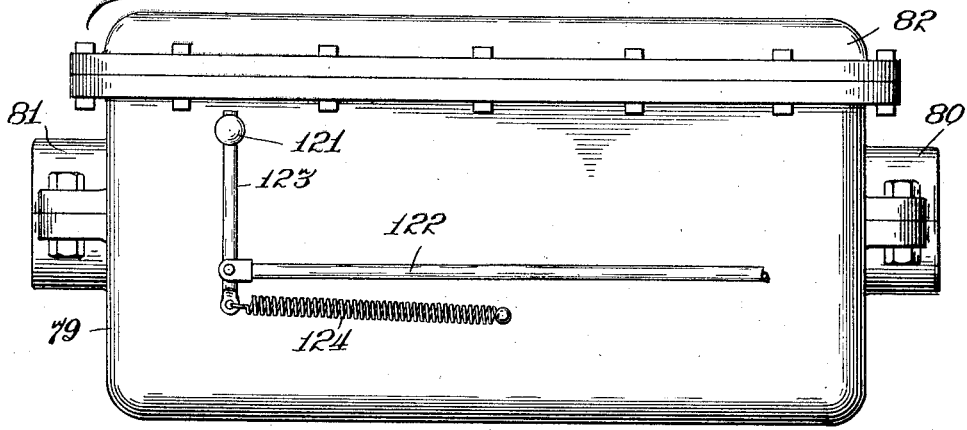
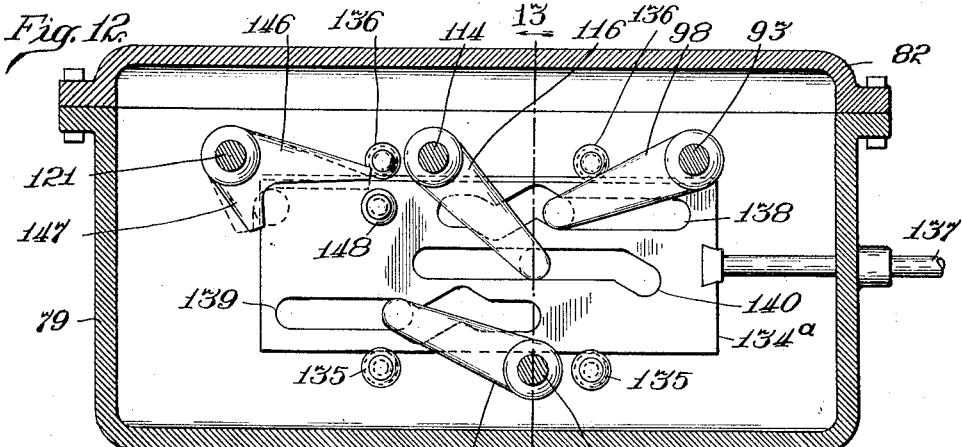
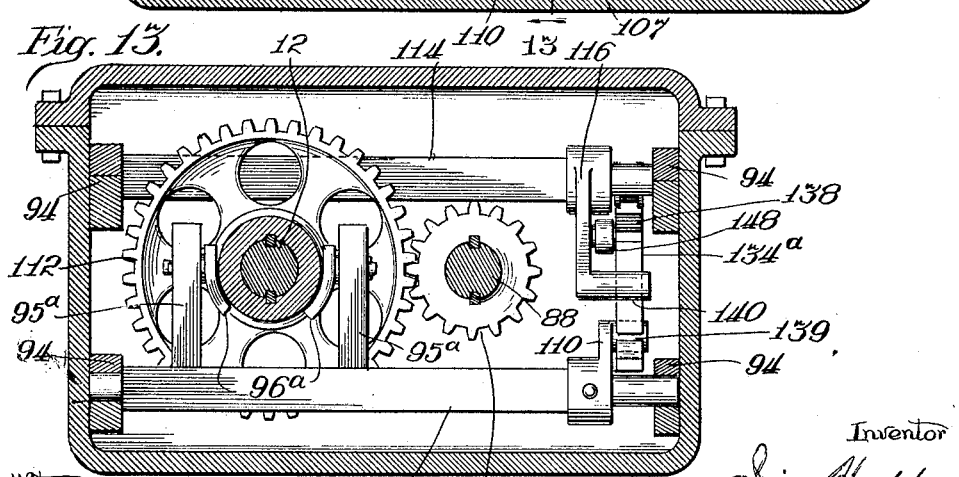

Patented Sept. 19, 1922.

1,429,349

UNITED STATES PATENT OFFICE.

IRVIN HUPP, OF CHICAGO, ILLINOIS, ASSIGNOR TO FLEXO MOTIVE CORPORATION, A CORPORATION OF DELAWARE.

TRANSMISSION MECHANISM.

Application filed November 19, 1917. Serial No. 202,784.

*To all whom it may concern:*

Be it known that I, IRVIN HUPP, a citizen of the United States, and a resident of Chicago, in the county of Cook and State of Illinois, have invented certain new and useful Improvements in Transmission Mechanism, of which the following is a description.

My invention relates to transmission mechanism adapted substantially to all situations where power is intended to be transmitted from a power shaft to a driven shaft at a plurality of speeds; the mechanism being especially intended for automobiles and the like; having for its object the provision of a gear transmission which enables a plurality of speeds to be obtained and the various speed changes or ratios to be effected without the necessity of shifting the gears.

My invention contemplates mechanism wherein the speed changes are produced through the reciprocating or sliding movement of a single member adapted to actuate a series of independently operable elements whereby different clutch mechanisms are successively operated and the desired ratio or speed thereby obtained; the clutch mechanisms being adapted to effect operative relation between the power shaft and the driven shaft, either directly, or by means of prearranged gears; all speeds forward and reverse as well as neutral position, being quickly effected through the manipulation of a single element.

The invention also contemplates a construction which obviates the possibility of actuating more than one speed unit, or correlated interlocking elements, at a given moment and therefore eliminates any possibility of locking the transmission or "stalling" the motor; a neutral position being obtained or passed through between each ratio or speed change; the specific conception of the invention contemplating the transmission of power from the power or driving shaft to a second or driven shaft at various speeds by means of gearing and the employment of clutch elements whereby respective portions of the gearing may be successively brought into operative relation with the respective shafts.

It is apparent from the construction shown that any speed reduction or change, required intermediate of the power shaft and the driven shaft, may be effected through the employment of suitably sized meshing gears and pinions, as will be readily understood from the detailed description of the accompanying drawings which form a part of my specification and wherein:—

Figure 2 is a longitudinal sectional view, taken on the line 2—2 of Figure 1 looking in the direction of the arrows.

Figure 3 is a longitudinal sectional view taken on the line 3—3 of Figure 1 looking in the direction of the arrows.

Figure 6 is a plan view of a modified form of my improved transmission with the cover or top of the casing removed.

Figure 7 is a longitudinal sectional view, taken on the line 7—7 of Figure 6 looking in the direction of the arrows.

Figure 8 is a longitudinal sectional view taken on the line 8—8 of Figure 6 looking in the direction of the arrows.

Figure 9 is a cross-sectional view taken on the line 9—9 of Figure 6 looking in the direction of the arrows.

Figure 10 is a cross-sectional view taken on line 10—10 of Figure 6 looking in the direction of the arrows.

Figure 11 is an elevation of the side shown at the top of Figure 6.

Figure 12 is a longitudinal sectional view showing a modified form; the view being taken on a line similar to Figure 8.

Figure 13 is a cross sectional view of the modification shown in Figure 12 taken on the line 13—13 of Figure 12 looking in the direction of the arrows.

Figure 1:
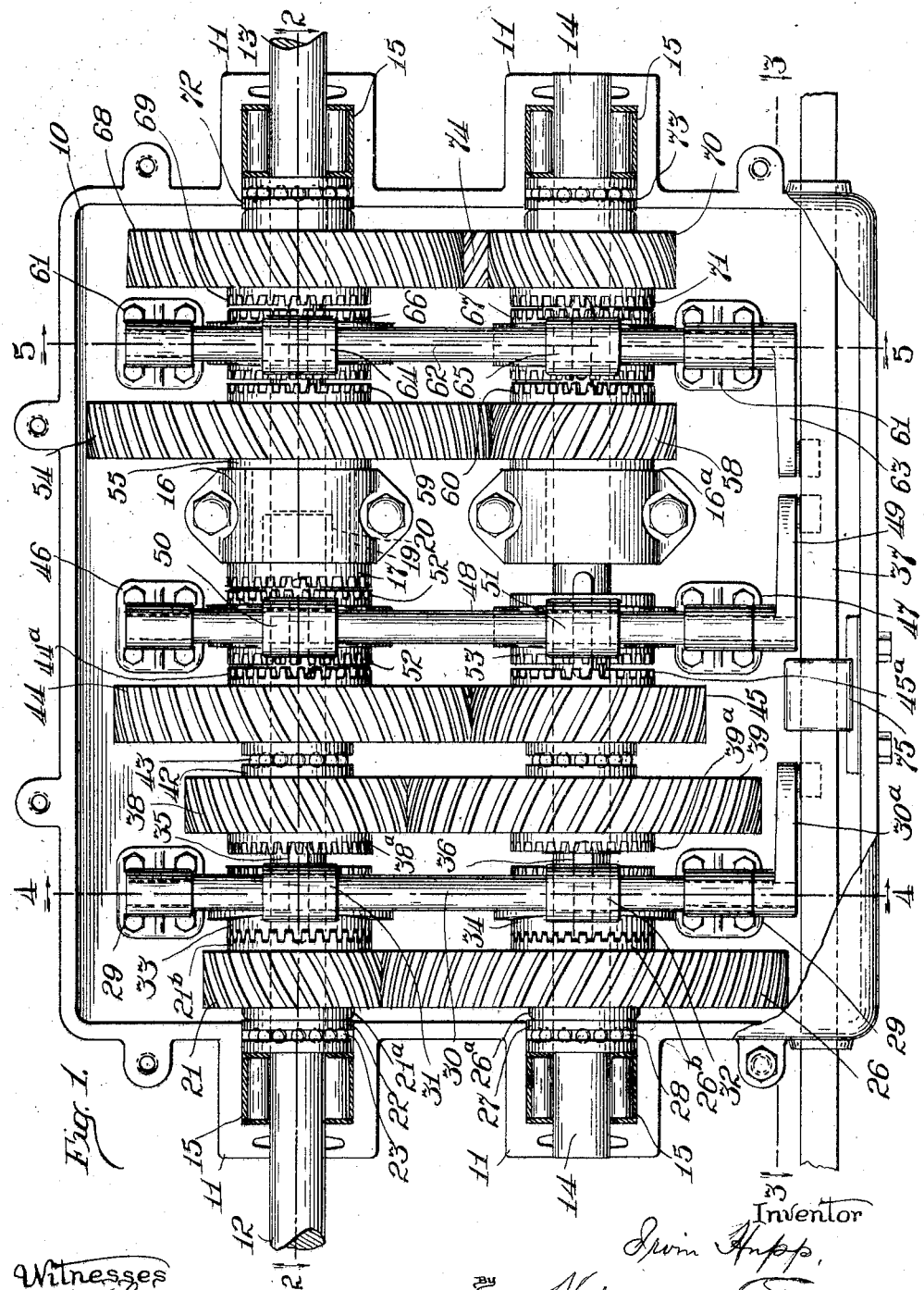
Figure 1 is a plan view of my improved transmission with the cover or top of the casing or housing removed.

In the specific exemplification of the invention, as illustrated in Figures 1 to 5, the transmission mechanism is shown enclosed in a suitable housing 10, of suitable metal, such as aluminum and the like; the housing comprising a bottom portion and a top or cover, which may be substantially similar in construction so as to provide an entire enclosure for the transmission mechanism, of sufficient depth to contain a sufficient quantity of oil to enable the gearing to be immersed, or at least partially so. Both portions of the housing 10 are provided on the same sides at registering points with bosses or hub-formations indicated at 11, see Figures 1 and 2, adapted to provide bearings for the power or drive shaft 12 and the driven shaft 13, as well as for a secondary or counter shaft 14. The bosses 11 are formed to provide pockets adapted to receive suitable anti-friction bearings, for example the bearing cases or housings 15, shown provided with roller bearings in Figures 1 and 2.

At a suitable point, the lower portion of the housing 10 is provided with suitable brackets 16 and 16ᵃ adapted to receive the inner ends of the power or drive shaft 12 and the driven shaft 13; while bracket 16ᵃ provides support for the counter shaft 14. The bracket 16 is provided with an opening therethrough of size sufficient to not only receive the ends of the shafts 12 and 13, but also receive the hub of a clutch-member 17 and bushings 18 surrounding the inner end of the power or drive shaft 12, and bushing 19 surrounding the hub portion of clutch member 17, see Figure 2. As disclosed in Figure 2, the inner end of the power or drive shaft 12 extends into the clutch member 17 and is free to rotate in the bushing 18; while the hub of clutch member 17 is keyed to driven shaft 13 by means of the keys indicated at 20, thus compelling driven shaft 13 and clutch member 17 to rotate together.

The transmission mechanism, as illustrated, is preferably shown provided with intermeshing oblique-toothed or helical gears, for the purpose of transmitting movement from one shaft to the other.

The power or drive shaft 12 is provided with a pinion 21, shown to the left in Figure 1 and to the right in Figure 2. The pinion 21 is maintained on the drive shaft 12 against movement lengthwise thereof by means of a hub-portion 21ᵃ adapted to bear against the member or shell 22 of the anti-friction or ball-bearings 23; the ball-bearing casing bearing against the housing 15 of the anti-friction or roller bearings previously described. The opposite side of the pinion 21 is provided with an extended clutch-forming portion 21ᵇ, preferably shown provided with a multiple of teeth or clutch surfaces, as more clearly shown in Figure 1. This side of the pinion may be somewhat counter-bored to receive a washer or collar 24, held in place by means of a pin 25 passing through the collar or washer and transversely through the drive-shaft 12, to maintain the pinion 21 against any movement longitudinally of the shaft; permitting the pinion 21, however, to be free to rotate on the shaft, or more properly speaking, to permit the drive-shaft 12 to rotate without transmitting rotation to the pinion.

The pinion 21 is arranged in mesh with a a gear 26 which is loosely mounted on the auxiliary or counter-shaft 14, see Figure 1. The gear 26, like pinion 21, is preferably provided with a hub-portion 26ᵃ, bearing against the plate or casing 27 of the anti-friction ball bearings shown at 28, which is mounted on the shaft adjacent the side of the roller-bearing housing 15 similar to that previously described; while the opposite side of the hub-portion of gear 26 is provided with the multi-toothed portion or clutch surface 26ᵇ.

Figure 4:
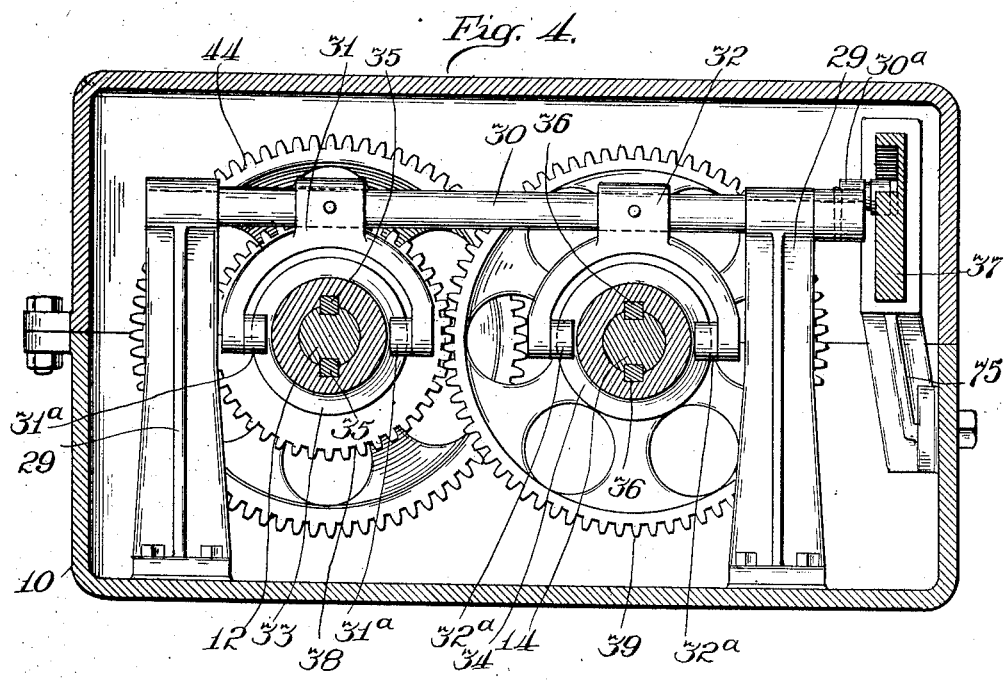
Figure 4 is a cross sectional view, taken on the line 4—4 of Figure 1 looking in the direction of the arrows.

In the particular exemplification, the housing 10 is provided with suitable brackets or standards 29, 29, see Figure 4, in which is mounted a rock-shaft 30 disposed transversely of the gear-casing or housing and across the top of the drive shaft 12 and the auxiliary or countershaft 14. The rock-shaft 30 is provided with a pair of bifurcated members or arms 31 and 32 secured thereto so as to oscillate when shaft 30 is rocked; the bifurcated ends of the arms 31 and 32 being provided with inwardly disposed trunnions or portions 31ᵃ and 32ᵃ adapted to extend into suitable grooves circumferentially disposed in clutch-members 33 and 34, respectively. Clutch-member 33 is feathered on the drive shaft 12 by means of key 35, so as to enable the clutch-member 33 to slide longitudinally of the shaft and at the same time to rotate therewith, see Figures 2 and 4; while clutch-member 34 is slidably keyed or feathered on shaft 14 by means of the keys 36, see Figure 4, thus enabling clutch-member 34 to move lengthwise of shaft 14 while at the same time being compelled to rotate therewith. Both clutch-members 33 and 34 are provided with a plurality of teeth or clutch-surfaces adapted to mesh with the surfaces of the hub-portions 21ᵇ of pinion 21 and hub-portion 26ᵇ of gear 26, respectively, see Figure 1. The end of rock-shaft 30 is provided with a crank-arm 30ᵃ, the end whereof is provided with a suitable pin and roller adapted to extend into a suitable cam-slot provided in an actuating member or rod 37 later to be described.

Both clutch-members 33 and 34 are provided with interlocking or clutching surfaces on both sides thereof so that they may be thrown into clutching engagement with the toothed surface or clutch-forming portions of a pinion 38 and a gear 39, respectively. Pinion 38, like pinion 21, is loosely mounted on drive-shaft 12; while gear 39, like gear 26, is loosely mounted on shaft 14. The hub-portions of pinion 38 and gear 39, disposed toward the clutch-elements 33 and 34, respectively, are toothed, as shown at 38ª and 39ª, respectively, see Figure 1. The pinion 38 and gear 39 are held against movement longitudinally of their shafts by means of similar washers or collars 40, which, like collar 24, are maintained in place by similar pins 41 passing transversely through the respective shaft. The opposite side of both pinion 38 and gear 39 is shown provided with a suitable member or casing 42 for the antifriction bearings or rollers 43, see Figures 1 and 2; while the other half of the casing 42 is shown bearing against the hub of an adjacent gear 44, loosely mounted on drive shaft 12, and a pinion 45 loosely mounted on counter shaft 14.

Disposed longitudinally of the housing, suitably supported in brackets or standards 46 and 47, is a rock-shaft 48, similar to rock-shaft 30; the rock-shaft 48 being provided at one end with a crank-arm 49 having a pin or extension, preferably provided with a roller or loose collar, adapted to extend into a suitable cam-slot in the rod or member 37. The rock-shaft 48, like rock-shaft 30, is provided with a pair of bifurcated members or arms 50 and 51 secured to the shaft so as to oscillate or rock therewith. The arms 50 and 51 are similar in construction to arms 31 and 32 and are adapted to control the clutch-members 52 and 53, respectively. The member 52 is feathered or slidably keyed on drive shaft 12, while the member 53 is slidably keyed on shaft 14; the clutch-member 52 being provided with teeth or clutch-forming surfaces adapted to mesh with the toothed or clutch-forming surface 44ª or gear 44; while the clutch 53 is provided with teeth or clutch-forming surfaces adapted to interlock with the clutch-forming surface 45ª of pinion 45.

The clutch-member 53 is provided with clutch-engaging surfaces on one side only, as shown in Figure 1; while clutch 52, like the previously described clutches, is provided with clutching surfaces on both sides; the clutch-forming surfaces on the right-hand side thereof in Figure 1 being adapted to engage with the clutch 17, keyed on the driven shaft 13 by the keys 20, as shown in Figure 2, thus enabling power to be transmitted from power or drive shaft 12 directly to the driven shaft 13 when clutch-member 52 is moved toward the right in Figure 1.

Loosely mounted on driven shaft 13, and on the opposite side of bracket or standard 16, is a gear 54, held against movement longitudinally of the shaft by a collar or washer 55 and a suitable collar or washer 56; the latter being secured in place by a pin 57. The gear 54 meshes with a pinion 58 loosely mounted on the auxiliary or counter shaft 14; the pinion 58 being secured against longitudinal movement on its shaft in a manner similar to that of gear 54 just described. The opposite or right-hand side of the hub of gear 54, in Figure 1, is provided with a clutch forming surface 59, while the hub of pinion 58 on its right-hand side in Figure 1 is provided with a clutch-forming surface 60.

The casing is provided to the right of gear 54 and pinion 58 in Figure 1 with the standards or brackets 61, 61 which support a transversely disposed rock-shaft 62; one end whereof is provided with a crank-arm 63. The rock-shaft 62 is provided with a pair of arms 64 and 65; the arms being bifurcated to straddle their respective clutch-members in a manner similar to the arms previously described; that is, arm 64 is adapted to control the double clutch-member 66, while arm 65 is adapted to control double clutch-member 67. Clutch member 65 is adapted to be moved into clutching engagement with the clutch-forming surface 59 of gear 54, while double clutch member 67 is adapted to be moved into clutching engagement with the clutch-forming surface 60 of pinion 58, when the clutch-members have been shifted to the left in Figure 1.

Clutch-member 66 is slidably keyed on driven shaft 13, while double clutch-member 67 is slidably keyed on auxiliary or counter shaft 14.

Clutch-member 66 is also adapted to be moved into clutching engagement with a gear 68 by means of the clutching surface 69 formed on the hub thereof; and clutch-member 67 is adapted to be moved into clutching engagement with pinion 70 by means of the clutch-forming surface 71 formed on the hub of pinion 70. The hub of gear 68 is extended to the opposite side and bears against the anti-friction ball-bearing casing 72 mounted on shaft 13 and abutting against the roller-bearing casing 15; while the hub of pinion 70 is similarly formed and bears against the roller-bearing casing 73 (on shaft 14) which abuts against the roller-bearing casing 15 on said shaft, see Figure 1.

Figure 5:
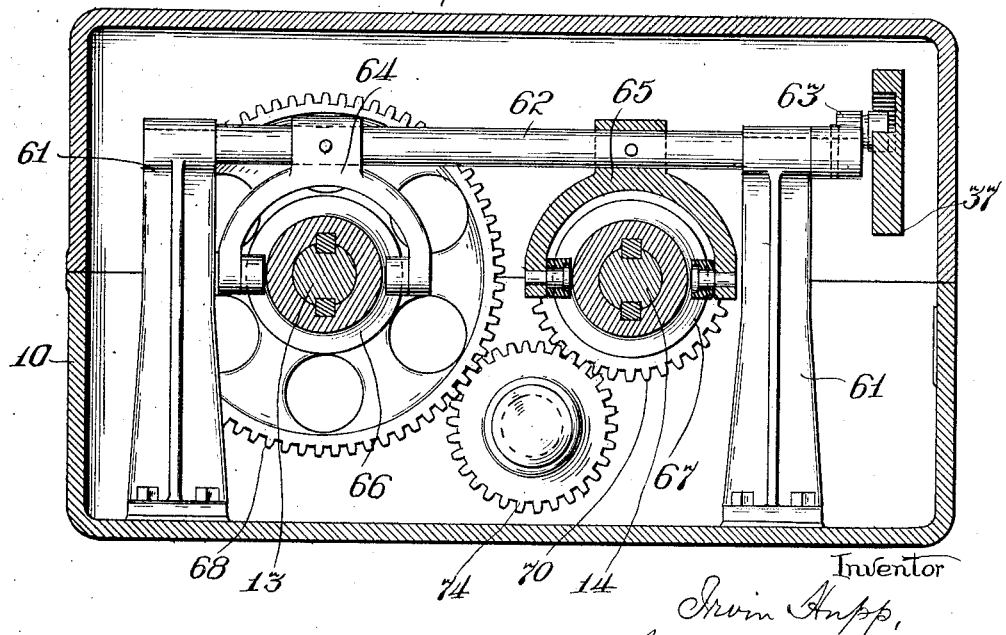
Figure 5 is a cross sectional view, taken on the line 5—5 of Figure 1 looking in the direction of the arrows.

The gear 68 and pinion 70 are not in mesh with each other, but motion is transmitted from one to the other by means of an idler 74, see Figures 1 and 5; the idler 74 being mounted on a suitable trunnion formed in the side of the housing.

The actuating rod or member 37, previously referred to, extends longitudinally through the housing, being slidably mounted therein, and is supported at a point intermediate of its ends within the housing by means of a suitable bracket 75, see Figures 1 and 4; the bracket being provided with a slot-way through which the member 37 slides. The rod 37 is provided with a number of cam-slots, as more clearly shown in Figure 3, of substantially equal length and of predetermined angular formation; the slots corresponding in number with the number of crank-arms formed on the ends of the various rock-shafts; for example in the exemplification, the cam-rod 37 is provided with three slots to receive the pins on the ends of the crank-arms 30ª of rock-shaft 30, 49 of rock-shaft 48 and 63 of rock-shaft 62. In order to prevent undue friction and permit the easy manipulation or sliding of the rod 37, the pins of the respective crank-arms may be provided with collars or rollers as shown in dotted lines in Figure 1 and in full lines in Figures 4 and 5.

The pin on the end of crank-arm 30ª extends into cam-slot 76; the pin on the end of crank-arm 49 extends into cam-slot 77, while the pin on the end of crank-arm 63 extends into cam-slot 78 formed in the actuating member or cam-rod 37, see Figure 3. The position of the crank-arms and their relation to the respective cam-slots, disclosed in Figure 3, is the position of the mechanism as shown in Figure 1, namely in inactive or neutral position; in which position clutch-members 33 and 34 are in clutching engagement with pinion 21 and gear 26 respectively, while all other clutches are shown in neutral positions. The slots are formed with predetermined angularities or inclinations adapted to cause the crank-arms to move upwardly and downwardly, or vice versa, so as to rock the different rock-shafts in such manner as to induce the bifurcated arms or forks carried thereby to move the clutch-mechanisms in similar direction, either to the right or left. The rod 37 is in position in Figures 1 and 3 to bring about what may be called the first speed ratio, namely with the pins on the crank-arms slightly removed from the adjacent ends of the cam-slots.

The ends of slot-way 76 are disposed horizontally, but in different horizontal planes, while the intermediate portion slopes upwardly and then recedes to the horizontal plane of the adjacent end of the slot; with the highest point of the slope-portion of the slot-way located in a horizontal plane above the ends of the slot-way, so that a complete shifting movement of bar 37 to the left in Figure 3 will cause crank-arm 30ª to move upward and thence downward, but not into as low a horizontal plane as it occupies when its crank-pin is at the initial or starting end of the slot, namely the left-hand end, as shown in Figure 3.

Slot-way 77, in order to provide a more compact form, is shown located in a lower horizontal plane in rod 37 than slot 76 and is provided with a horizontally disposed portion at the left-hand end of comparative length, namely of a length equal to the length, from the left-hand end to the apex of the inclined portion, of slot 76, slot 77 then declines for a short distance equal to the declining portion of slot 76, and then inclines, terminating in a horizontal plane above that of the initial or starting end thereof.

Slot 78 is provided with an initial or upwardly inclining end, of a length substantially equal to the length of the initial or left-hand horizontal portion of slot-way 76; the inclining end terminates in a horizontally disposed portion, substantially equal to the length of the inclining and declining portion of slot 76. The slot then declines a distance substantially equal to the declining portion of slots 76 and 77, and terminates in a short horizontal portion.

With the correlated parts in the position illustrated in Figure 3, namely with the cam-rod in position to be shifted to the left in Figure 3, or to the right in Figure 1, the mechanism will be in neutral position, in which position clutch-members 33 and 34 are held in clutching engagement with the pinion 21 and gear 26, respectively, as shown in Figure 1, while the other clutch members, actuated by rock-shafts 48 and 62, will be out of clutching engagement with their respective gears. With this condition, power will be transmitted from drive shaft 12 through pinion 21 to gear 26 and thence to counter-shaft 14; but as none of the other clutch mechanisms are in operative or clutching position, no power can be transmitted from counter-shaft 14 to the driven shaft 13.

In the position shown in Figure 3, the crank-pin of crank-arm 30ª is at a point intermediate of the ends of the horizontally disposed initial or left-hand end of cam-slot 76; while crank-pin on crank 49 is in the horizontal portion of cam-slot 77 slightly removed from left-hand end; and crank-pin on crank 63 is at a point half-way up the inclining end of cam-slot 78, so that slight additional movement of rod 37 to the left in Figure 3 will not impart movement to crank-arm 30ª of rock-shaft 30, and the clutch mechanisms 33 and 34 will still remain in clutching engagement with pinion 21 and gear 26, respectively. Such movement, however, of actuating rod 37 will cause crank-arm 63 to be moved upwardly by reason of the inclining portion of slot-way 78, and this upward movement of crank-arm 63 will cause rock-shaft 62 to be rocked in a direction which will cause clutch-mechanisms 66 and 67 to be thrown into clutching engagement with gear 54 and pinion 58, respectively. This will cause power to be transmitted from drive-shaft 12 through pinion 21, gear 26, counter-shaft 14, pinion 58 to gear 54 mounted on driven shaft 13 and thus give what may be termed the first speed ratio.

Further movement of actuating bar 37 to the left will bring the pin of crank-arm 30ª into the upwardly inclining portion of slot-way 76; while the pin of crank-arm 63 will be in the horizontally disposed portion of slot-way 78; (the pin of crank-arm 49 still remaining in the long horizontal portion of slot 77). This position will cause crank-arm 30ª to move slightly upwardly, and cause rock-shaft 30 to move about its longitudinal axis a distance sufficient to cause clutch-mechanisms 33 and 34 to be moved out of clutching relation with pinion 21 and gear 26, respectively; while the crank-arm 63 will remain unmoved and therefore leave clutch-mechanisms 64 and 65 in clutching relation with gear 54 and pinion 58, respectively. This may be termed a neutral position because no power is being transmitted from shaft 12 to shaft 14.

A somewhat further movement of rod 37 to the left, so as to bring the crank pin of crank-arm 30 at the apex or topmost point of the inclined portion of slot-way 76, will cause rock-shaft 30 to be oscillated so as to shift clutch-mechanisms 33 and 34 to the right in Figure 1 and therefore into clutching relation with pinion 38 and gear 39, respectively. With the horizontally disposed portion of slot 78 made of a length sufficient to extend beyond the point or moment where the crank-pin of crank 30ª has reached the apex of the angular or inclining portion of slot-way 76, it is evident that crank-arm 63 will still remain inactive and therefore permit the clutch-mechanisms 66 and 67 to remain in clutching engagement with gear 54 and pinion 58, respectively, and thus provide the second speed ratio resulting from power being transmitted from drive-shaft 12, through pinion 38, gear 39, shaft 14, pinion 58 to gear 54 which is now in operative relation with driven-shaft 13.

During this period or moment, the crank-pin of crank 49 has reached the extreme right-hand end of the horizontal portion of slot-way 77, at which point the rock-shaft 48, and therefore the clutch-mechanisms controlled thereby, are still in neutral or inoperative position.

A further shifting of rod 37 toward the left in Figure 3, however, will cause the crank-pin of crank-arm 30ª to move downwardly in the declining portion to the right of the slot-way, namely to the beginning of the horizontally disposed portion of the slot-way at the right-hand end of slot-way 76. This position of the crank-arm will cause rock-shaft 30 to be rocked on its longitudinal axis in a direction which will cause clutch-mechanisms 33 and 34 to be moved out of clutching engagement with clutch surfaces 38ª and 39ª of pinion 38 and gear 39, respectively. On the other hand, the crank-pin of crank 63 on rock-arm 62 will still be in the horizontally disposed portion of slot-way 78 and therefore maintain the clutch-mechanisms 66 and 67 in clutching engagement with clutch-surfaces 59 and 60 of gear 54 and pinion 58, respectively. As no power is being transmitted to shaft 14 because of disengagement of clutch mechanisms 33 and 34, the transmission will be in neutral position until the bar 37 is given further movement to the left in Figure 3, which causes the crank-pin of crank 49 to move to the lowest point in the angularly disposed or declining portion of slot-way 77, thereby causing rock-shaft 48 to be moved so as to force clutch-mechanisms 52 and 53 into clutching engagement with clutch-surfaces 44ª of gear 44 and 45ª of pinion 45, respectively. The horizontally disposed portion of slot-way 78, being of a length to extend beyond the period or moment when the rock-shaft has reached the point just described, leaves clutch-mechanisms 66 and 67 in clutching engagement with gear 54 and pinion 58 (while clutch mechanisms 33 and 34 are in their neutral or inoperative position by reason of the crank-pin on crank 30ª of shaft 30 having entered the horizontally disposed portion at the right-hand end of slot-way 76). It is evident, therefore, that with the crank-arms 49 and 63 in the positions just assumed, power will be transmitted from power or drive shaft 12 through gear 44, pinion 45, shaft 14, pinion 58 and gear 54 to driven-shaft 13, thus providing what may be termed a third speed ratio.

Moving the actuating rod 37 a degree further to the left in Figure 3 maintains rock-shaft 30 in neutral position by reason of the horizontally disposed portion at the right of slot-way 76; while such movement brings the crank-pin of crank 63 into the horizontal portion at the right of slot-way 78, while crank-pin of crank 49 is also moved into the upwardly inclining part of slot-way 77 and at the lower end thereof. Such positioning of the crank-arms with their respective rock-shafts will cause the clutch-mechanisms which were last in clutching engagement, to-wit 52, 53, 66 and 67, to be moved out of clutching engagement so that the transmission will again be in neutral position.

As the extreme right-hand ends of the respective slot-ways have not as yet been reached by the pins on the respective crank-arms, further movement of actuating rod 37 to the left may still be had, which movement will leave the crank-pin of crank 30ª in the horizontally disposed portion at the right of slot-way 76 (a neutral position); crank-pin of crank 63 in the horizontally disposed portion at the right of slot-way 78 (which, however, is in a lower horizontal plane than the intermediate horizontal portion of slot-way 78 and therefore still leaves the clutch-mechanisms operated by shaft 62 in intermediate or neutral position), while the crank-pin of crank 49 will have reached the limit of the upwardly inclining portion of slot-way 77, thereby causing rock-shaft 48 to be rocked to the right in Figure 1 so as to move clutch-mechanism 52 into clutching engagement with clutch-member 17 which is keyed on driven-shaft 13; and as there is no gear or pinion mounted immediately to the right of clutch-mechanism 53 on counter-shaft 14, clutch-mechanism 53 becomes inoperative during such movement of rock-shaft 48. As all other clutch-mechanisms have been moved to neutral or inoperative positions, it is evident that power will now be transmitted from power or driving-shaft 12 directly to driven shaft 13 by means of clutch-mechanism 52 and clutch 17, thus providing a fourth speed ratio.

It is evident that reverse movement of actuating or cam-rod 37, namely to the right in Figure 3, will induce the transmission to pass inversely through the various speed ratios as previously described, causing the various crank-arms and their respective rock-shafts to be returned to the initial positions occupied prior to obtaining the first speed ratio, as set forth in the foregoing description, namely the position shown in Figure 3.

With the transmission in the position indicated in Figure 3, namely just prior to being moved into the first speed ratio as heretofore described, the extreme left-hand ends of the different cam-slots 76, 77 and 78, as illustrated in Figure 3, have not been reached by the crank-pins of the crank-arms. As the left-hand ends of slots 76 and 77, however, are horizontally disposed, the rock-shafts 30 and 48 will remain inactive during movement of rod 37 to the right from the position shown in Figure 3.

Such movement will cause rock-shaft 62 to be rocked toward the right, or rather in unclockwise direction, in Figure 1, because of the downwardly extending left-hand end of slot 78 into a plane below that of the right-hand end or neutral positioning of said rock-shaft 62. The movement of shaft 62 just described will force clutch-mechanisms 66 and 67 into interlocking engagement with gear 68 and pinion 70, respectively. With the pin of crank-arm 30ᵃ in the left-hand end of slot 76, clutch mechanisms 33 and 34 will be in engagement with pinion 21 and gear 26, respectively, so that power will be transmitted from drive shaft 12, through pinion 21, gear 26, counter-shaft 14, pinion 70, idler 74, gear 68 to driven shaft 13. With the idler 74 disposed intermediate of pinion 70 and gear 68, it is apparent that driven shaft 13 will be given movement in a reverse direction from that imparted to it by the other intermeshing pinions and gears.

As will be seen, with the specific exemplification of the invention as disclosed in the drawings, the mechanism provides four speeds forward and one reverse; it will be understood, however, that the number of speed ratios may be increased or diminished to suit the various requirements by increasing or diminishing the number of intermeshing pinions and gears, the controlling clutch mechanisms and cam-slots, or cam-action producing relation between the clutch-controlling elements and the actuating rod 37.

As is evident from the construction shown and described, the various speed changes or ratios are obtained without the necessity of shifting any intermeshing gears, thus eliminating all danger of gear "stripping"; while, at the same time, the various speed changes, forward and reverse, are all obtained by the operation of a single member, and without the necessity of any great amount of movement thereof.

It is further apparent that the relation between the respective clutch-mechanisms, rock-shafts and the construction and positioning of the cam-slots or grooves in the actuating rod, or cam-action producing relation btween the actuating rod and the rock-shafts, are such that it is impossible to bring more than a predetermined number of pinions and gears into operative relation with their respective shafts at a given moment, so that the possibility of "locking" the transmission or stalling the motor is absolutely impossible; a neutral position of the transmission being obtained intermediate of every speed change.

The construction of the housing enables the intermeshing and moving elements of the transmission to be substantially immersed or run in oil; while at the same time ready access may be had to all of the parts of the transmission by removal of the cover-portion of the housing.

In the modification of the invention as illustrated in Figure 6, certain of the gears of the transmission are keyed to the counter-shaft so as to be at all times in positive connection therewith, thereby obviating the necessity of employing the number of clutch mechanisms disclosed in the previous figures; a few of the gears on the counter-shaft being loosely mounted in order that they may idle when the shaft is rotated at high speed induced by the other gear or speed ratios. This modification also presents a construction wherein the mechanism is placed in reverse by separate and independently operable mechanism when the shifting or actuating means of the transmission is at a predetermined point in its movement and the possibility of shifting the mechanism into reverse while the transmission mechanism is in a high speed ratio, made impossible.

In this construction the housing 79, like housing 10, is made of sufficient depth to permit the mechanism, or a major portion thereof, to be submerged in oil; the housing being provided with hollow bosses, as at 80, to receive suitable roller bearings 15 arranged in suitable housings at the ends of the respective shafts which are rotatably mounted in the housing. The bearing-receiving bosses 80 have counter-part portions 81 removably secured on the bosses in any suitable manner, as indicated at Figure 6, so as to permit the ready removal of the entire mechanism by simply removing the cover or top 82 and the counter-part portions 81.

The housing receives the end of the power or drive-shaft 12 which is shown aligned with the driven-shaft 13; the adjacent ends of the two shafts being supported by a suitable bracket, indicated at 83, which is shown supported from the bottom of the casing or housing, see Figure 7. The hub-portion of bracket 83 is provided with a bore of sufficient size to receive the extended hub-portion of a clutch member 84 which is keyed to driven shaft 13 by means of the keys 20, similar to the construction shown in Figure 2; while the inner end of the power or drive-shaft 12 is provided with a suitable bushing, as at 18, which permits shaft 12 to freely rotate within the clutch element 84.

Like the construction shown in the first figure of the drawings the transmission mechanism is preferably provided with helical or oblique-toothed gears; with the gears of the respective sets in constant meshing relation with each other.

The power-shaft 12 is shown provided with a gear 85 loosely mounted thereon and held against movement longitudinally of the shaft by any suitable means, as for example by the ball-bearing casing 22 and an elongated key 86, see Figure 7. The gear 85 meshes with a large gear 87 loosely mounted on a counter-shaft 88 which has suitable bearing in the housing or casing and is disposed parallel with the drive-shaft and the driven shaft previously referred to. The gears 85 and 87 are shown provided with extended hub-portions having a series of clutch-forming surfaces at 89 and 90, respectively, which are adapted to be engaged by the clutch-members 91 and 92, respectively. Clutch-member 91 is slidably keyed on shaft 12, while clutch-member 92 is slidably keyed on counter-shaft 88. The clutch-forming surfaces on the gear-hubs and of the clutch elements comprise series of teeth, with the teeth of the one surface or member bevelled in the opposite direction of bevel of the teeth of the other surface or member, as clearly shown in Figure 6. This construction ensures a positive and prompt clutching relation being effected as soon as the clutch mechanisms or elements are shifted into close relation with each other. The clutch mechanisms 91 and 92 are provided with clutching surfaces on both sides thereof so as to provide double clutch-members adapted to engage with gears disposed on opposite sides thereof. The clutch mechanisms 91 and 92 are intended to be operated in unison by means of a rock-shaft or member 93, disposed transversely of the power or driven-shaft and the counter-shaft; the rock-shaft at its ends made cylindrical and mounted in bearing-blocks 94 removably secured to the side of the casing, as shown in Figure 9. The rock-shaft 93 is provided with a plurality of depending arms 95, preferably one pair for each shaft, with the arms of each pair disposed on opposite sides of the shafts, see Figure 9. These arms are adapted to extend into the same horizontal plane occupied by the drive-shaft 12 and the counter-shaft 88, with the lower ends of the depending arms arranged to receive the trunnions formed on the arcuate blocks or shoes 96 which extend into circumferential grooves formed in the clutch-members 91 and 92, respectively. The trunnions of the blocks or shoes 96 may extend through the arms 95 and be maintained in place by suitable cotter pins where sufficient space is permitted, or the trunnions may be provided with circumferential grooves adapted to receive the pins 97 extending transversely of the arms, thereby preventing the shoes from becoming disengaged from their respective arms when the rock-shaft is moved into and out of place; the pins 97 being especially employed where lack of space, as for example between the clutch elements of the power-shaft and the counter-shaft, see Figure 9, will not permit the trunnions of the blocks or shoes to extend entirely or sufficiently through the arms to permit the use of cotter-pins. This ensures the mechanism being maintained in proper assembled relation while the elements are being put into place. The rock-shaft 93, adjacent one of its ends, is provided with a crank-arm 98 disposed in a prearranged direction and secured to the rock-shaft so as to oscillate or rock therewith.

Located on the opposite side of clutch member 91 and loosely mounted on drive-shaft 12 is a gear 99 arranged in mesh with a gear 100 which is loosely mounted on counter-shaft 88. Gears 99 and 100 are provided with extended hubs having series of clutch-forming surfaces 101 and 102, adapted to be engaged by the clutch elements 91 and 92, respectively. The clutch-forming surfaces of the clutch elements and gear hubs, like those on the opposite sides of the rock-shaft, are beveled, respectively, in opposite directions so as to ensure positive and prompt clutching relation being formed between the clutch-members and the gears the moment the clutch elements have been brought into close relation with each other.

The gears 99 and 100 are maintained against movement lengthwise of their respective shafts by elongated keys, one of which is shown at 86 in Figure 7; while the opposite side of gear 99 and the adjacent side of a gear 103 are provided with the ball-bearings 104 disposed in suitable race-ways, as shown, thereby providing antifrictional relation between the gears and also preventing longitudinal movement thereof. Gear 103 is loosely mounted on drive-shaft 12 and is in constant mesh with gear 105; and the hub of gear 105 is in abutting relation with the hub of gear 100, as shown. Gear 105 is keyed to the counter-shaft 88 by key 106, see Figure 6, so that gear 105 will constantly rotate with counter-shaft 88; but as gears 99 and 103 are loosely mounted on the power or drive-shaft 12, no power will be transmitted to the counter-shaft 88 through said gears until one of said gears 99 or 103 have been engaged by their respective clutch mechanism. On the other hand, rotation of counter-shaft 88, by means of gears 85 and 87, will merely cause gear 103 to freely rotate or idle on shaft 12 without in any way affecting its operation.

Transversely disposed of the housing or casing, and to the right of gear 103 in Figure 6, is a rock-shaft 107, similar in construction to rock-shaft 93, except that the rock-shaft 107 is merely provided with a pair of depending arms, like arms 95, which are provided with shoes or blocks similar to those shown at 96 in Figure 9, disposed on opposite sides of drive-shaft 12 in a circumferential groove arranged in a clutch-member 108 which is slidably keyed on drive-shaft 12. The hub of gear 103 extends toward clutch-member 108 and is provided with a series of clutch-forming surfaces 109 with which the clutch-member 108 is adapted to engage when the clutch is shifted to the left in Figure 6 through proper movement of rock-shaft 107. As gear 105 is keyed to counter-shaft 88, no clutch mechanism is necessary. The clutch 108 induces positive relation between drive-shaft 12 and gear 103, and thus causes power to be transmitted to counter-shaft 88 through gear 103 and gear 105 at a speed ratio somewhat greater than the speed ratio caused by intermeshing gears 99 and 100, which latter speed ratio in turn is somewhat greater than the speed ratio induced by gears 85 and 87. The rock-shaft 107 is provided with a crank-arm 110 secured thereto so as to oscillate or rock with the shaft and disposed in a predetermined direction; the rock-shaft having suitable bearings at opposite ends in the bearing-blocks 94 secured to the side walls of the housing of the transmission.

Clutch element 108 is provided with clutch-forming surfaces on both sides so as to adapt it to form clutching engagement with the clutch surfaces 111 formed on the hub of gear 112 loosely mounted on the drive-shaft 12; gear 112 being arranged in mesh with gear 113 which is keyed on counter-shaft 88 so as to constantly rotate therewith.

Mounted transversely of the casing, and on the right hand side of gear 112 in Figure 6, is a rock-shaft 114, similar in construction to rock-shaft 107 and provided with one pair of depending arms, similar to arms 95, arranged to have controlling relation with a sliding clutch-member 115 which is feathered on drive-shaft 12. The clutch member 115 is adapted to form clutching engagement with clutch-member 84 keyed on the end of driven shaft 13. The rock-shaft 114 is provided with a crank-arm 116, which is secured to the rock-shaft so as to oscillate or rock therewith and disposed in a predetermined direction; the ends of the rock-shaft 114, like the rock-shafts previously described, having suitable bearings in the bearing-blocks 94 secured to the walls or sides of the housing. As is evident from the construction shown, when rock-shaft 114 is oscillated to the right in Figure 6, clutch-element 115 will be brought into clutching engagement with clutch-member 84, drive-shaft 12 will thereby be directly connected with driven-shaft 13, thus providing a direct drive, or what may be termed a fifth speed ratio.

Loosely mounted on driven-shaft 13, and to the right of the standard or bracket 83, in Figure 6, is a gear 117 which meshes with a gear 118 keyed to counter-shaft 88 so as to constantly rotate therewith. The hub of gear 117 is provided with a series of clutch-forming surfaces 119 with which double clutch-member 120 is adapted to engage. Clutch-member 120 is controlled by a rock-shaft 121 (similar to rock-shaft 114), provided with a pair of depending arms similar to arms 95 and having shoes or blocks arranged to take into a circumferential groove formed in member 120 and on opposite sides of said member 120, so that rocking movement of the shaft 121 will cause clutch-member 120 to be moved lengthwise of driven-shaft 13 either toward or away from gear 117. The rock-shaft 121 has suitable bearings in the bearing-blocks 94 secured to the walls of the housing or casing, with one of its ends, however, extended through the housing, as shown in Figures 6 and 10, so as to permit operation of this rock-shaft from the housing-exterior by means of a reach-rod 122 which is suitably secured to the end of the depending arm 123 secured to the end of rock-shaft 121, see Figure 10. With this construction reciprocatory movements of reach-rod 122 will cause oscillation or rocking movements of rock-shaft 121. Rock-shaft 121 is normally held in the position shown in Figure 6, namely in the position where clutch-member 120 is in clutching engagement with gear 117, by means of a suitable spring indicated at 124, which may be suitably secured to a pin or lug formed on the side wall of the housing and to the lower end of arm 123; the spring exerting a pulling action on the arm 123, thus causing rock-shaft 121 to rock in a clock-wise direction in Figure 6 and therefore maintain clutch-member 120 in the position shown in Figure 6, whereby operative relation between driven-shaft 13 and gear 117 is maintained.

With gear 118 keyed to counter-shaft 88 and gear 117 in clutching engagement with driven-shaft 13, it is apparent that power will be transmitted to driven-shaft 13 from drive-shaft 12 by means of the selective gear thrown into clutching engagement with the drive-shaft and the correlated or intermeshing gear on the counter-shaft 88. In other words, power may be transmitted through gear 85 meshing with gear 87 on counter-shaft 88 thence through gear 118 meshing with gear 117; or through gear 99, gear 100, counter-shaft 88, gear 118, gear 117 to driven-shaft 13; or through gear 103, gear 105, counter-shaft 88, gear 118, gear 117 to the driven-shaft 13; or through gear 112, gear 113, counter-shaft 88, gear 118 gear 117 to driven-member 13; so that four speed ratios will be provided, in the particular exemplification, which are transmitted through the counter-shaft; while a fifth speed ratio or direct drive is transmitted from power or drive-shaft 12 to driven-shaft 13 by means of clutch-elements 115 and 84.

Loosely mounted on driven-shaft 13, and to the right of the rock-shaft 121 in Figure 6, is a gear 125, held against movement longitudinally of shaft 13 by a key 126, which feathers the clutch member 120 to the driven-shaft. The opposite side of the hub of gear 125 is in abutting relation with the ball-bearing race-way 127 mounted on shaft 13 adjacent the end wall of the housing or casing. The hub of the gear 125 is provided with clutch-forming surfaces at 128, with which the double clutch-member 120 is adapted to engage when rock-shaft 121 is rocked or oscillated in the proper direction so as to shift clutch-member 120 out of clutching engagement with gear 117 and toward gear 125. The clutch-forming surfaces of the respective gear-hubs and the various clutch-members are all formed by oppositely beveled teeth, as clearly shown in Figure 6, so as to induce a quick and positive clutching engagement between the respective members.

Gear 125 is arranged in constant mesh with pinion 129 which is suitably mounted on a stud or bracket 130 disposed upwardly from the bottom of the casing or housing, as shown in Figure 10; and the pinion 129 is in constant mesh with a pinion 131 keyed on counter shaft 88 by means of suitable keys shown at 132 in Figure 10; the pinion 131 being maintained against movement longitudinally of shaft 88 by the keys 132 and the ball-bearing race-way shown at 133 in Figure 6. It is evident that when clutch member 120 is shifted to the right in Figure 6, into clutching engagement with gear 125, rotation of shaft 88 will cause driven-shaft 13 to be rotated in reverse direction from the direction of rotation induced by the other intermeshing gears 118 and 117, because of the pinion or idler 129. As is also apparent from the construction shown, shifting of clutch member 120 into clutching engagement with gear 125 will move it out of engagement with gear 117 so that rotation of shaft 88, induced by any of the gears on drive-shaft 12, will be imparted in a reverse direction to driven-shaft 13.

Slidably mounted at one side of the casing or housing is a cam-plate or actuating member 134, preferably mounted between the antifriction members or rollers 135 at the bottom and the rollers 136 at the top thereof, see Figures 8 and 9; these rollers being supported on stub-shafts secured in the side wall of the main casing or housing or in any other suitable manner. The rollers are preferably of the flanged construction shown more clearly in Figure 9, so as to prevent any sidewise movement or play of the cam-plate or actuating member 134, which is provided with a suitable reach-rod or operating link 137 leading to a suitable point where it will be controllable from the seat of the operator.

The cam-plate or member 134 is provided with a number of slots 138, 139 and 140 of predetermined lengths and with varying prearranged angularities, adapted to receive the angularly disposed free ends of the crank arm 98 on rock-shaft 93, crank-arm 110 on rock-shaft 107, and crank-arm 116 on rock-shaft 114, see Figure 8. The cam-plate or actuating member 134 is of such length that when in what may be termed normal position, as indicated in full lines in Figure 8, the end thereof will be at some distance removed from the rock-shaft 121 so that initial movement of the cam-plate or actuating member 134 (which movement is in a direction transversely of the respective rock-shafts) will in no way affect the normal position of rock-shaft 121. The normal position of rock-shaft 121 is maintained by the action of a spring 124, namely the position where the rock-shaft 121 forces the clutch-member 120 into engagement with the hub of gear 117.

With the cam-plate 134 in the position shown in Figures 6 and 8, no power will be imparted to counter-shaft 88 by drive-shaft 12, because all of the clutch-members on the drive-shaft are out of clutching engagement with their respective gears. With the downwardly disposed portion in slot 138, at a short distance removed from the left hand end of the slot in Figure 8, a slight movement of cam-plate 134 to the left in said figure (or to the right in Figure 6) will cause the end of crank-arm 98 to move downwardly with the formation of the slot, and thus oscillate or rock shaft 93 in clock-wise direction in Figure 6, and move both clutch-members 91 and 92 into clutching engagement with the clutch-elements 89 and 90 of gears 85 and 87, respectively, so that power will be transmitted from drive-shaft 12 to counter-shaft 88. With such movement of cam-plate 134, rock-shafts 107 and 114 will remain inactive, because of the long horizontally disposed ends of slots 139 and 140 into which the free ends of crank-arms 110 and 116 extend, respectively. As clutch-member 120 is normally held in clutching engagement with gear 117 through the action of spring 124 on rock-shaft 121, it is evident that power is being transmitted from drive-shaft 12 through gears 85 and 87, counter-shaft 88 and gears 118 and 117; thus providing what may be termed the first speed ratio.

Further shifting of cam-plate 134, a predetermined extent, to the left in Figure 8 and to the right in Figure 6, will bring the free end of crank-arm 98 into the upwardly sloping portion of slot 138. We will assume that the movement of cam-plate 134 has been just sufficient to cause the end of crank-arm 98 to be at an intermediate point in the upwardly sloping portion of the slot-way 138, namely at a point which is in the same horizontal plane as the ends of slot 138. In this position the rock-shaft 93 will have been oscillated sufficiently in unclockwise direction in Figure 6 to move clutch-members 91 and 92 slightly to the right in Figure 6 out of clutching engagement with the respective gears 85 and 87, to-wit a neutral position, at which time no power is being transmitted to counter-shaft 88 from drive-shaft 12 and therefore no power is being transmitted from counter-shaft 88 to driven-shaft 13. Continuing to move plate 134 in its travel to the left in Figure 8, which is to the right in Figure 6, will bring the end of crank-arm 98 at the top of the inclined portion of slot-way 138. This will cause rock-shaft 93 to be rocked in unclockwise direction in Figure 6 (or clockwise direction in Figure 8) and force clutch-members 91 and 92 to the right in Figure 6, and therefore into clutching engagement with gears 99 and 100, respectively. The horizontally disposed initial or left hand ends of slots 139 and 140, as disclosed in Figure 8, are of a length corresponding with the angular end of slot 138, so that no actuation of crank-arms 110 and 116 will have been induced while the cam-plate 134 has been shifted the extent just referred to. It is apparent therefore that power is now being transmitted from drive-shaft 12 through gears 99 and 100, counter-shaft 88 and gears 118 and 117 to driven-shaft 13, at what may be termed a second speed ratio.

Moving the cam-plate 134 still further to the left in Figure 8, which is to the right in Figure 6, will bring the downwardly disposed angular portion of cam-slot 139 where it will cause crank-arm 110 to drop downwardly in Figure 8, which induces rock-shaft 107 to move in clockwise direction in Figure 6, sufficiently to force clutch-member 108 into clutching engagement with gear 103, while the end of crank-arm 116 is still riding in the horizontally disposed end of slot 140; at which time the end of crank-arm 98 will have reached the beginning of the horizontally disposed right hand end of slot 138 in Figure 8. As gear 105 is keyed to counter-shaft 88, it is evident that power is now being transmitted from drive-shaft 12 through gears 103 and 105 to counter-shaft 88 and thence to driven-shaft 13 by means of gears 118 and 117. This provides what may be termed the third speed ratio.

Upon further shifting of cam-plate 134 to the right in Figure 6, and to the left in Figure 8, will leave the free end of crank-arm 98 in the horizontally disposed end of slot 138 and the free end of crank-arm 116 in the horizontally disposed portion of slot 140, while the free end of crank-arm 110 will be forced into the upwardly disposed portion of the slot-way 139, namely at a point intermediate of the incline portion and therefore into the same horizontal plane as the horizontally disposed ends of slot 139. This will cause rock-shaft 107 to be moved in unclockwise direction in Figure 6, a distance sufficient to shift clutch-member 108 into neutral position intermediate of gears 103 and 112, so that no power will be transmitted from the drive-shaft 12 to counter-shaft 88. Continuing the movement of cam-plate 134 a given degree will bring the free end of crank-arm 110 to the top of the inclined portion of slot 139 (at which time the free ends of the crank-arms 98 and 116 are in the horizontally disposed portions of their respective slots) and cause rock-shaft 107 to be moved in unclockwise direction in Figure 6 and thereby force clutch-member 108 toward the right in said figure and into clutching engagement with gear 112. As gear 113 is keyed to shaft 88, power will be transmitted from drive-shaft 12 through gears 112 and 113, counter-shaft 88 and gears 118 and 117 to driven-shaft 13, at what may be termed a fourth speed ratio.

The horizontally disposed portion of slot 140 is of a length somewhat greater than the distance from the initial or left hand end to the highest point of the angular portion of slot 139, so cam-plate 134 may be given further movement to the left in Figure 8 without actuating crank-arm 116, while crank-arm 110 is moving down into the horizontally disposed portion at the right of slot 139 in Figure 8, thus causing rock-shaft 107 to oscillate sufficiently to move clutch-member 108 out of clutching engagement with gear 112, thereby placing the transmission again in neutral position.

The rock-shaft 121 is provided with a pair of arms 141 and 142 disposed in opposite directions, see Figures 6 and 8; the arms being also arranged at an angle to each other, and at a distance removed from the end of the rock-shaft 121. The arm 141 is disposed toward the cam-plate 134, but not in alignment therewith so as not to interfere with the reciprocation of cam-plate 134 to the right in Figure 6. The arm 142, however, has its free end bent at an angle so as to be disposed in the path of the cam-plate 134, see Figure 6. Cam-plate 134, at a predetermined point removed from the left hand end thereof in Figure 8, is provided with a roller 143, adapted to have operative engagement with the hub-portion 144 of the two arms 141 and 142, as shown in dotted lines in Figure 8, so that when the cam-plate 134 has been shifted sufficiently to bring the roller 143 into engagement with hub 144, the rock-shaft 121 will be rocked against the action of spring 124 a sufficient distance to move the clutch-member 120 out of clutching engagement with gear 117. The roller 143 will not come into engagement with hub 144 until the arms 98 and 110 have reached what may be termed neutral points in their respective slots 138 and 139, that is the neutral points at the right hand ends of the slots in Figure 8, so that clutch 120 will still remain in clutching engagement with gear 117 while power is being transmitted to the counter-shaft through gears 85 and 87, 99 and 100, 103 and 105, and 112 and 113; in other words the roller 143 does not affect rock-shaft 121 (and therefore the relation between clutch 120 and gear 117) until it is desired to transmit power direct from drive-shaft 12 to driven-shaft 13, at which time, of course, it is necessary to disengage gear 117 from the driven-shaft 13. The roller 143 is so placed on cam-plate 134 that it will not have reached a point beneath arm 141, while the cam-plate is shifting through first and second speeds, but will be in position beneath arm 141 when cam-plate 134 has been shifted far enough to cause rock-shaft 107 to be actuated to effect the third speed ratio. With roller 143 beneath arm 141, it will prevent movement of rock-shaft 121 by means of lever or reach-rod 122. By the time roller 143 is in operative engagement with the hub 144, the end of cam-plate 134 will also be in striking engagement with the angularly disposed end of arm 142. The cam-plate 134 is provided with a protruding portion or lug 145 disposed in a horizontal plane above the horizontal plane occupied by the angularly disposed end of arm 142. With the construction shown, and as indicated in dotted lines in Figure 8, when roller 143 is in operative engagement with the hub 144 of rock-shaft 121 and has caused rock-shaft 121 to rotate sufficiently to move clutch 120 out of clutching engagement with gear 117, the angularly disposed end of arm 142 will be in striking engagement with the underside of lug 145.

With the projection or lug 145 extending over the end of arm 142, it is evident that further oscillation of rock-shaft 121 in unclockwise direction in Figure 6, or to the left in Figure 8,—namely, in a direction which would shift double clutch-member 120 into clutching engagement with gear 125,—is made impossible. The purpose in providing this construction is to make it impossible to move the clutch-mechanism or member into reverse while the transmission is in direct drive. In Figure 8, some of the positions of the cam plate and its relation to the rock-shaft 121 are shown in dotted lines, with the normal position, namely the position induced by spring 124, being shown in full lines.

The effective position of roller 143, relative to the hub 144 on rock-shaft 121, namely where roller 143 causes the rock-shaft 121 to so move that clutch-member 120 is disengaged from gear 117, does not obtain until the arm 110 has reached the horizontal portion at the right of slot 139, and clutch-member 108, controlled thereby has been moved to neutral position. The neutral position of clutch-member 120, induced by the positioning of rock-shaft 121, as shown in dotted lines in Figure 8, is brought about at the moment the end of arm 116 of rock-shaft 114 reaches the declining portion of slot 140. Slight additional movement of the cam-plate 134 therefore causes the end of arm 116 to ride down in the declining end of slot 140, thereby rocking shaft 114 in unclockwise direction in Figure 6. This will cause clutch-member 115 to move into engagement with clutch-member 84 keyed to driven-shaft 13, thereby causing power to be transmitted directly from drive-shaft 12 to driven-shaft 13, and provide what may be termed a fifth speed ratio.

As is evident from the construction shown and described, the reverse drive is obtained through movement of a suitable lever connected to reach-rod 122; such operation of double clutch-member 120, however, is not possible under all conditions. For instance, the reverse condition cannot be obtained while the drive-shaft is directly connected with the driven-shaft, because lug 145 will prevent sufficient movement of rock-shaft 121, whereby clutch-member 120 is moved into engagement with gear 125; while the positions occupied by roller 143 when the mechanism is in either the fourth or third speed ratio, will prevent the oscillation or downward movement of arm 141, and thus prevent proper oscillation of rock-shaft 121; the construction thereby being made "fool proof" as it were, preventing the operation, accidental or otherwise, of the reverse mechanism with the transmission in direct drive or any of the high-speed ratios.

In Figures 12 and 13 I illustrate a modified form of cam-plate 134ª and the positioning and arrangement of the various arms secured to the ends of the different rock-shafts. In this construction, like in the preceding figures, the cam-plate or actuating member is slidably mounted between the rollers 135 at the bottom and the rollers 136 at the top. The rock-shafts are all pivotally mounted at their ends in suitable bearing-blocks 94, as in the construction previously described. In this construction, however, the rock-shaft 107 is mounted transversely beneath the cam-plate; while rock-shafts 93 and 114 are disposed across the top of the plate 134ª as in the other construction. As shown in Figure 12, the cam-slot 140 is disposed intermediate of slots 138 and 139; slot 139 being located near the bottom of the plate 134ª to receive the free end of the arm 110 secured to rock-shaft 107. Figure 12 illustrates the cam-plate 134ª so far shifted to the left that the end of arm 98 of rock-shaft 93 is entering the neutral portion of slot 138 after the first and second speed ratios have been passed through; while the end of arm 110 of rock-shaft 107 is about to pass into the declining portion of slot 139, namely, where the mechanism is about to move into the third speed ratio; and the end of arm 116 of rock-shaft 114 is in the horizontal or neutral portion of slot 140, so that rock-shaft 114, which controls the direct drive clutch member, will remain inactive.

The rock-shaft 121, like in the previous figures, is mounted at a point beyond the normal or first speed position of the cam-plate 134ª. The rock-shaft 121 is shown provided with an arm 146 disposed toward the cam-plate, and provided with a downwardly presented projection or heel 147. The rock-shaft 121, it will be understood, is intended to be actuated by a rod similar to that shown at 122 in Figures 6 and 11, and to be under spring tension, which may be induced in a manner similar to that previously described and caused by the spring 124 in Figures 6 and 11. The cam-plate 134ª is provided with a roller 148, placed at a predetermined point relative to the positions of the various rock-shaft arms 98, 110 and 116, in their respective slots, and disposed in the path of the heel or projection 147 of arm 146. This roller 148 will come beneath the end of arm 146 immediately after the mechanism is shifted out of the second speed ratio and as it is passing into the third speed ratio, thus providing a lock against the manipulation of rock-shaft 121 into reverse-gear shift while the transmission is running in any of the high speed ratios. On the other hand, the roller 148 will be in contact with the heel 147 of arm 146 (as shown in dotted lines in Figure 12) when the cam-plate 134ª has been shifted far enough where the end of arm 116 is about to enter the declining portion of slot 140, namely where rock-shaft 114 will be so oscillated that the clutch-member controlled thereby will directly connect the drive-shaft with the driven-shaft. Where the rock-shaft 107 is disposed beneath the cam-plate, it is understood, of course, that the clutch-controlling members or shoe-holding arms are disposed upwardly on opposite sides of the shaft 12, as shown at 95ª in Figure 13; the arms 95ª being provided with the shoes 96ª in a manner similar to that previously shown and described.

It is understood, of course, that in practice, the housing 79 is made of such depth, and the gear mechanism is so mounted therein, as to enable a partial or almost complete immersion of the gears in oil, as well as the cam-plate or actuating member, common to all of the forward speed controlling mechanisms.

I have shown and described what I believe to be the best forms of the invention, but alterations may be made in certain details without, however, departing from the spirit of my invention.

What I claim is:—

1. Transmission mechanism, comprising, in combination with a power shaft, a driven shaft and a counter shaft, a plurality of gears loosely mounted on said shafts, the gears on the power shaft and the driven shaft meshing with the gears on the counter shaft, clutch mechanisms feathered on all of said shafts intermediate of adjacent gears and intermediate of the power shaft and the driven shaft, means whereby the clutch mechanisms may be actuated and moved into engagement with the gears on either side thereof, and a member common to all of said means whereby predetermined portions of said means are actuated at prearranged moments in the movement of said member.

2. Transmission mechanism comprising, in combination with a power shaft and a driven shaft arranged in aligned relation with each other, a counter shaft disposed parallel with both of said first mentioned shafts, a plurality of gears loosely mounted on all of said shafts, the gears on the power shaft and the driven shaft meshing with the gears on the counter shaft, clutch mechanisms feathered on all of said shafts at points intermediate of adjacently placed gears and adapted to alternately form clutching engagement with the gears on opposite sides of said mechanisms, means whereby the clutch mechanisms on the power shaft and the counter shaft and on the driven shaft and the counter shaft may be simultaneously actuated in pairs, and a member common to said means whereby predetermined portions of the latter are actuated at prearranged moments in the movement of said member.

3. Transmission mechanism comprising, in combination with a power shaft, a driven shaft and a counter shaft, a plurality of helical gears loosely mounted on all of said shafts with the gears on the power shaft and on the driven shaft meshing with the gears on the counter shaft, a plurality of clutch mechanisms arranged intermediate of the various gears and their respective shafts for effecting operative relation therebetween and directly between the power shaft and the driven shaft, means whereby the clutch mechanisms on the power shaft and the counter shaft and clutch mechanisms on the counter shaft and the driven shaft may be actuated in pairs, and a member common to all of said means whereby portions of the latter are actuated at prearranged moments in the movement of said member.

4. Transmission mechanism comprising, in combination with an aligned power shaft and driven shaft, a counter shaft disposed parallel with both shafts, a plurality of gears loosely mounted on all of said shafts, with the gears on the power shaft meshing with some of the gears on the counter shaft, while the gears on the driven shaft mesh with some of the gears on the counter shaft, clutch mechanisms arranged intermediate of the gears and their respective shafts for effecting operative relation between the gears and their respective shafts, and means whereby said mechanisms may be actuated.

5. Transmission mechanism comprising, in combination with a power shaft, a driven shaft and a counter shaft, a plurality of gears loosely mounted on all of said shafts, with the gears on the power shaft meshing with some of the gears on the counter shaft, while the other gears on the counter shaft mesh with those on the driven shaft, clutch mechanisms intermediate of all of the gears and their respective shafts, and means whereby a clutch mechanism on each of said shafts may be simultaneously actuated at prearranged moments in the movement of said means.

6. Transmission mechanism comprising, in combination with a power shaft, a driven shaft and a counter shaft, a plurality of helical gears loosely mounted on all of said shafts, the gears on the power shaft meshing with some of the gears on the counter shaft, while the other gears on the counter shaft mesh with those on the driven shaft, clutch mechanisms feathered on all of said shafts intermediate of adjacently placed gears and intermediate of the power shaft and the driven shaft whereby operative relation may be effected between the power shaft and the driven shaft through said counter shaft or directly between the power shaft and the driven shaft, means whereby a clutch mechanism on each of said shafts may be simultaneously actuated.

7. Transmission mechanism comprising, in combination with a power shaft and a driven shaft, a counter shaft, intermeshing gears loosely mounted on all of said shafts, clutch mechanisms arranged in pairs intermediate of the gears on the power shaft and gears on the counter shaft and intermediate of gears on the counter shaft and the gears on the driven shaft, and means whereby predetermined clutch mechanisms are actuated at prearranged intervals in the operation of said means.

8. Transmission mechanism comprising, in combination with a power shaft and a driven shaft, a counter shaft disposed parallel with the first mentioned shafts, intermeshing gears loosely mounted on all of said shafts, a plurality of clutch mechanisms feathered on the different shafts and adapted to provide operative relation between adjacent gears and their respective shafts, rock-shafts disposed transversely of the first mentioned shafts whereby a clutch mechanism on the power shaft and on the counter shaft and on the counter shaft and on the driven shaft may be simultaneously operated, and a member common to all of said rock-shafts whereby a prearranged number of gears is placed into operative relation with their respective shafts at predetermined intervals in the movement of said member.

9. Transmission mechanism comprising, in combination with a power shaft and a driven shaft, a counter shaft arranged parallel with said first mentioned shafts, intermeshing gears loosely mounted on all of said shafts, a plurality of clutch mechanisms feathered on said shafts intermediate of the gears and their respective shafts and intermediate of the power shaft and the driven shaft, rock-shafts disposed transversely of the other shafts, each rock-shaft being arranged in operative relation with a pair of clutch mechanisms, and a member common to all of said rock-shafts whereby a predetermined number of clutch mechanisms is actuated at prearranged moments in the movement of said member.

10. Transmission mechanism comprising, in combination with a power shaft and a driven shaft, a housing adapted to receive the ends of both shafts and provide bearings therefor so as to maintain said shafts in aligned relation, a counter shaft arranged in said housing parallel with the first mentioned shafts, intermeshing gears loosely mounted on all of said shafts, clutch mechanisms feathered on all of said shafts intermediate of adjacent gears and intermediate of the ends of the power shaft and the driven shaft, rock-shafts disposed transversely of the first mentioned shafts, each rock-shaft having operative relation with a pair of clutch mechanisms, and means whereby the rock-shafts will be given predetermined movement at prearranged moments in the operation of said means.

11. Transmission mechanism comprising, in combination with a power shaft and a driven shaft arranged in aligned relation, a housing enclosing the ends of said shafts and providing bearings therefor, a counter shaft mounted in said housing and disposed parallel with said first mentioned shafts, intermeshing gears loosely mounted on all of said shafts, a plurality of clutch mechanisms feathered on the different shafts intermediate of adjacently placed gears, means whereby the clutch mechanisms may be moved in opposite directions and placed into operative engagement with the gears on opposite sides thereof so as to effect operative relation between the power shaft and the driven shaft by means of the selected gears and said counter shaft, and means whereby the first mentioned means are given predetermined movement at prearranged intervals in the operation of said last mentioned means.

12. Transmission mechanism comprising, in combination with a power shaft and a driven shaft, a housing adapted to receive the ends of both shafts and to maintain them in aligned relation with each other, a counter-shaft mounted in said housing and disposed parallel with the first mentioned shafts, intermeshing gears loosely mounted on all of said shafts, anti-friction bearings in said housing for all of said shafts and adapted to receive the end thrusts of said gears, a plurality of clutch mechanisms feathered on all of said shafts intermediate of adjacent gears and adapted to be alternately moved into operative relation with gears on opposite sides thereof, rock-shafts disposed transversely of the first three mentioned shafts, each rock-shaft having operative relation with a pair of clutch mechanisms, and means whereby the rock-shafts may be given predetermined movement at prearranged moments in the movement of said means.

13. Transmission mechanism comprising, in combination with a power shaft and a driven shaft, a counter shaft arranged parallel with said first mentioned shafts, intermeshing gears loosely mounted on all of said shafts, a plurality of clutch mechanisms feathered on said shafts intermediate of the gears and their respective shafts and intermediate of the power shaft and the driven shaft, rock-shafts disposed transversely of the other shafts, each rock-shaft arranged in operative relation with a pair of clutch mechanisms, and a reciprocating member common to all of said rock-shafts and disposed transversely thereof whereby the rock-shafts will be given predetermined movement at prearranged moments in the reciprocation of said member.

14. Transmission mechanism comprising, in combination with a power shaft and a driven shaft, a counter shaft disposed parallel with the other shafts, a plurality of gears loosely mounted on all of the shafts, with the gears on the counter shaft meshing with those on the power shaft and the driven shaft, clutch mechanisms on all of the shafts arranged intermediate of adjacently placed gears on the different shafts for effecting operative relation between the shafts and gears, a plurality of rock-shafts, each of which has operative relation with a clutch mechanism on two shafts and adapted to actuate the same simultaneously, and a slidably mounted member common to all of the rock-shafts adapted to give the latter prearranged movement at predetermined periods in the movement of said member.

15. Transmission mechanism, comprising, in combination with a power shaft and a driven shaft, a counter shaft disposed parallel with the other shafts, a plurality of gears loosely mounted on all of the shafts, with the gears on the counter shaft meshing with those on the power shaft and the driven shaft, a plurality of clutch mechanisms arranged in series on the power shaft and counter shaft and on the counter shaft and driven shaft adapted to effect operative relation between gears located on opposite sides thereof and their respective shafts, and means common to all of the clutch mechanisms adapted to actuate a prearranged series of said mechanisms at predetermined moments in the movement of said means.

16. Transmission mechanism comprising, in combination with a power shaft and a driven shaft, a counter shaft disposed parallel with the other shafts, a plurality of gears loosely mounted on all of the shafts, with the gears on the counter shaft meshing with those on the power shaft and on the driven shaft, a plurality of clutch mechanisms arranged intermediate of adjacently placed gears on the different shafts for effecting operative relation between the shafts and gears, rock-shafts, each of which has operative relation with a clutch mechanism on two shafts to actuate the same simultaneously, and a slotted member, common to all of the rock-shafts, arranged to move in a direction transversely of said shafts and in operative relation therewith, whereby the selective rock-shafts are operated at predetermined moments in the movement of said member.

17. Transmission mechanism comprising, in combination with a power shaft and a driven shaft, a counter-shaft, intermeshing gears on all of said shafts, clutch-mechanisms for effecting operative relation between the first two shafts and between the shafts and the gears, oscillatingly mounted means, different portions whereof have controlling relation with different clutch-mechanisms, and an actuating member having slot and pin connection with said means whereby movement will be imparted to different portions of said means at predetermined moments in the operation of said member.

18. Transmission mechanism comprising, in combination with a power shaft, a driven shaft and a counter shaft, intermeshing means adapted to transmit power from the power shaft to the driven shaft through said counter shaft at different speeds, clutch-mechanisms for effecting operative relation between the power shaft and the driven shaft and between the desired gear and shaft, means adapted to control said clutch-mechanisms, and an actuating member having cam-action producing relation with said means whereby movement will be imparted to different portions of said means at pre-arranged intervals in the operation of said member.

19. Transmission mechanism comprising, in combination with a drive-shaft, a counter shaft and a driven-shaft, a plurality of correlated elements adapted to be actuated in prearranged groups and operative relation between the shafts produced, means whereby the respective groups are separately controlled, a member common to all of said means and provided with a plurality of actuating surfaces at predetermined points and of predetermined formation, each surface being adapted to control a different group of said correlated elements at prearranged intervals in the movement of said member, and spring-controlled means whereby reverse operative relation between the driven shaft and the other shafts may be effected.

20. Transmission mechanism, in combination with a drive shaft, a driven shaft and a counter shaft, a plurality of gears adapted to transmit power from the drive shaft through the counter shaft to the driven shaft at predetermined speeds and in predetermined directions, means whereby direct operative relation between the drive shaft and the driven shaft may be effected, a plurality of oscillatingly mounted members whereby different gears and said means may be operatively affected, a slidably mounted bar, having a plurality of slots of varying inclinations, in operative relation with some of said members, whereby they are oscillated in pre-arranged directions at predetermined moments in the movement of said bar, and pressure-exerting means whereby one of said oscillatingly mounted members may be actuated.

21. Transmission mechanism comprising, in combination with a power shaft, a driven shaft and a counter shaft, a plurality of intermeshing gears mounted on said shafts, clutch mechanisms whereby the operative relation of the gears to the driven shaft and of the power shaft to the driven shaft may be controlled, oscillatingly mounted means whereby the clutch mechanisms are controlled, a reciprocating member adapted to actuate predetermined portions of said means at pre-arranged moments in its reciprocation, and means whereby a portion of said oscillatingly mounted means may be controlled independently of said reciprocating member.

22. A transmission mechanism comprising, in combination with a power-shaft and a driven-shaft, a counter-shaft disposed parallel with said first mentioned shafts, intermeshing gears mounted on all of said shafts and arranged in groups adapted to transmit power from the drive-shaft through the counter-shaft to said driven-shaft at different speeds, a plurality of oscillatingly mounted members, each of which has operative relation with a different group of gears, a slidably mounted member provided with a plurality of slots of varying inclinations arranged in operative relation with some of said oscillatingly mounted members whereby the latter are oscillated in prearranged directions at predetermined moments in the movement of said slidable member, means intermediate of one of said oscillatingly mounted members and said slidable member whereby the oscillatingly mounted member is held against oscillation when said slidable member is at a given point in its movement, and spring-controlled means whereby said last mentioned oscillatingly mounted member may be actuated.

23. Transmission mechanism comprising, in combination with a power-shaft and a driven-shaft arranged in aligned relation, a counter-shaft disposed parallel with said first mentioned shafts, intermeshing gears mounted on said shafts whereby power may be transmitted from the power-shaft through the counter-shaft to the driven-shaft at different speeds, a plurality of clutch mechanisms whereby operative relation between the gears and their shafts may be effected, means whereby the clutch mechanisms may be moved in opposite directions and placed into operative engagement with gears on opposite sides thereof, a cam-action producing member whereby a portion of said means is actuated at predetermined moments in the operation of said member, spring-controlled means whereby a portion of said first mentioned means may be actuated, and means intermediate of said cam-action producing member and the last mentioned portion of said first mentioned means whereby the latter will be held against operation during a part of the travel of said cam-action producing member and be given predetermined movement when the latter has reached a predetermined point in its movement.

24. Transmission mechanism comprising, in combination with a power-shaft and a driven-shaft, a counter-shaft disposed parallel with said shafts, a plurality of intermeshing gears intermediate of said counter-shaft and said first mentioned shafts, clutch mechanisms whereby the loosely mounted gears and their respective shafts may be operatively connected together, oscillatingly mounted members whereby the clutch mechanisms are controlled, a reciprocating member disposed transversely of said oscillatingly mounted members and adapted to actuate a prearranged number thereof, and means whereby one of the oscillatingly mounted members is separately controlled.

25. Transmission mechanism comprising, in combination with a power-shaft and a driven-shaft, a counter-shaft disposed parallel with the first mentioned shafts, a plurality of gears mounted on all of said shafts, a plurality of elements whereby the operative relation of said gears is controlled, a reciprocating member disposed transversely of said elements and adapted to actuate a predetermined number thereof, and means whereby the other element is separately controlled.

26. Transmission mechanism comprising, in combination with a power-shaft and a driven-shaft, a counter-shaft disposed parallel with the first mentioned shafts, a plurality of gears mounted on all of said shafts, a plurality of mechanisms whereby the operative relation of said gears is controlled, a reciprocating member disposed transversely of said mechanisms and adapted to actuate a predetermined number thereof, means whereby the other of said mechanisms is separately controlled, and means intermediate of the separately controlled mechanism and said reciprocating member whereby the former is held against movement when the latter is at a predetermined point in its reciprocation.

27. Transmission mechanism comprising, in combination with a drive-shaft and a driven-shaft, a counter-shaft disposed parallel with said first mentioned shafts, intermeshing gears arranged intermediate of the counter-shaft and both of said first mentioned shafts, a plurality of clutch mechanisms adapted to effect operative relation between the drive-shaft and the driven-shaft and between said shafts and their respective gears, rock-members in controlling relation with different clutch mechanisms, a slide-member having cam-slot engagement with some of said rock-members while the other rock-member is normally spring-controlled, and means intermediate of said slide-member and said spring-controlled rock-member whereby the latter is given predetermined movement when the slide-member reaches a predetermined point in its movement and said rock-member held against further movement when said slide-member has moved beyond said predetermined point.

IRVIN HUPP.

Witnesses:
GEORGE HEIDMAN,
F. A. FLORELL.